Feb. 17, 1925.
J. H. HERTNER
TRUCK
1,527,136
Original Filed Sept. 10, 1919  3 Sheets-Sheet 1
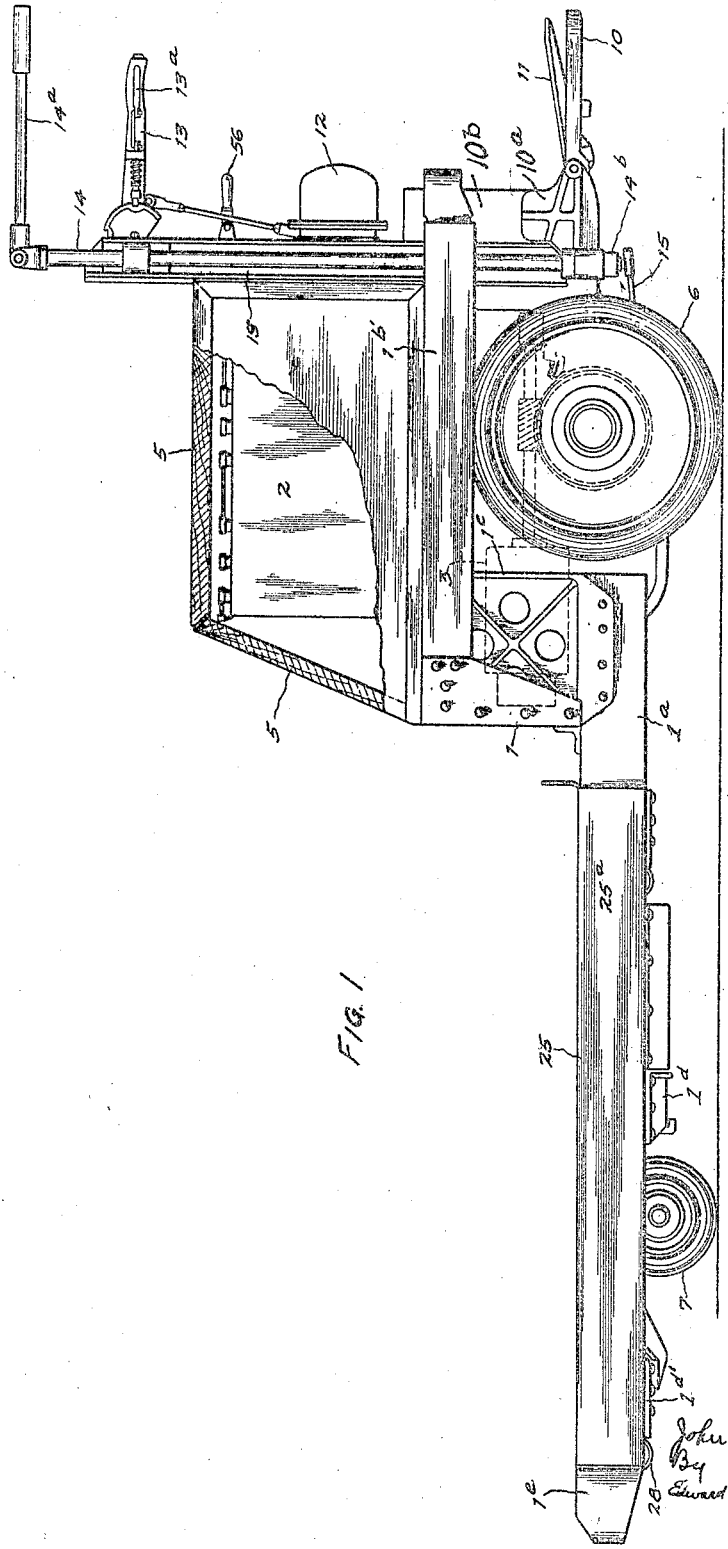

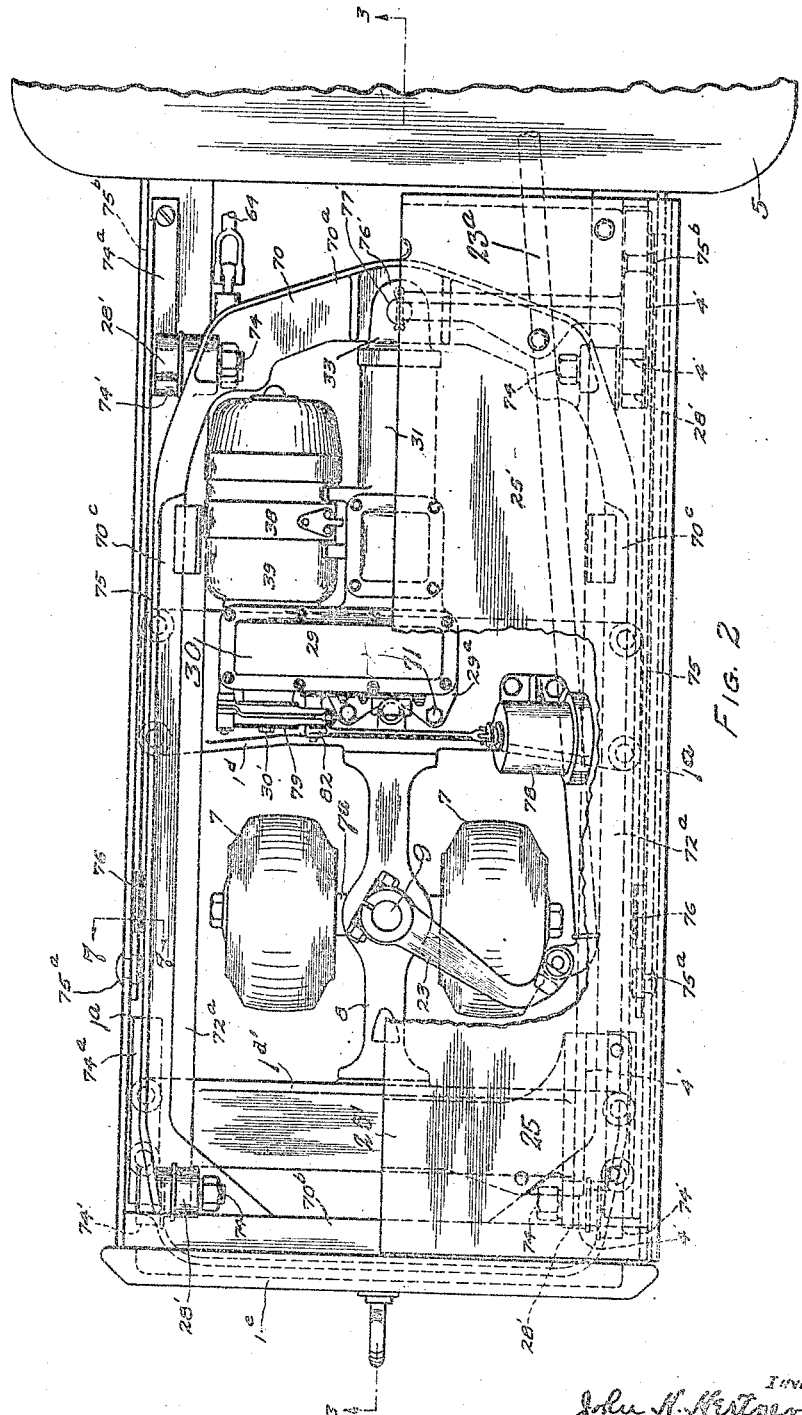

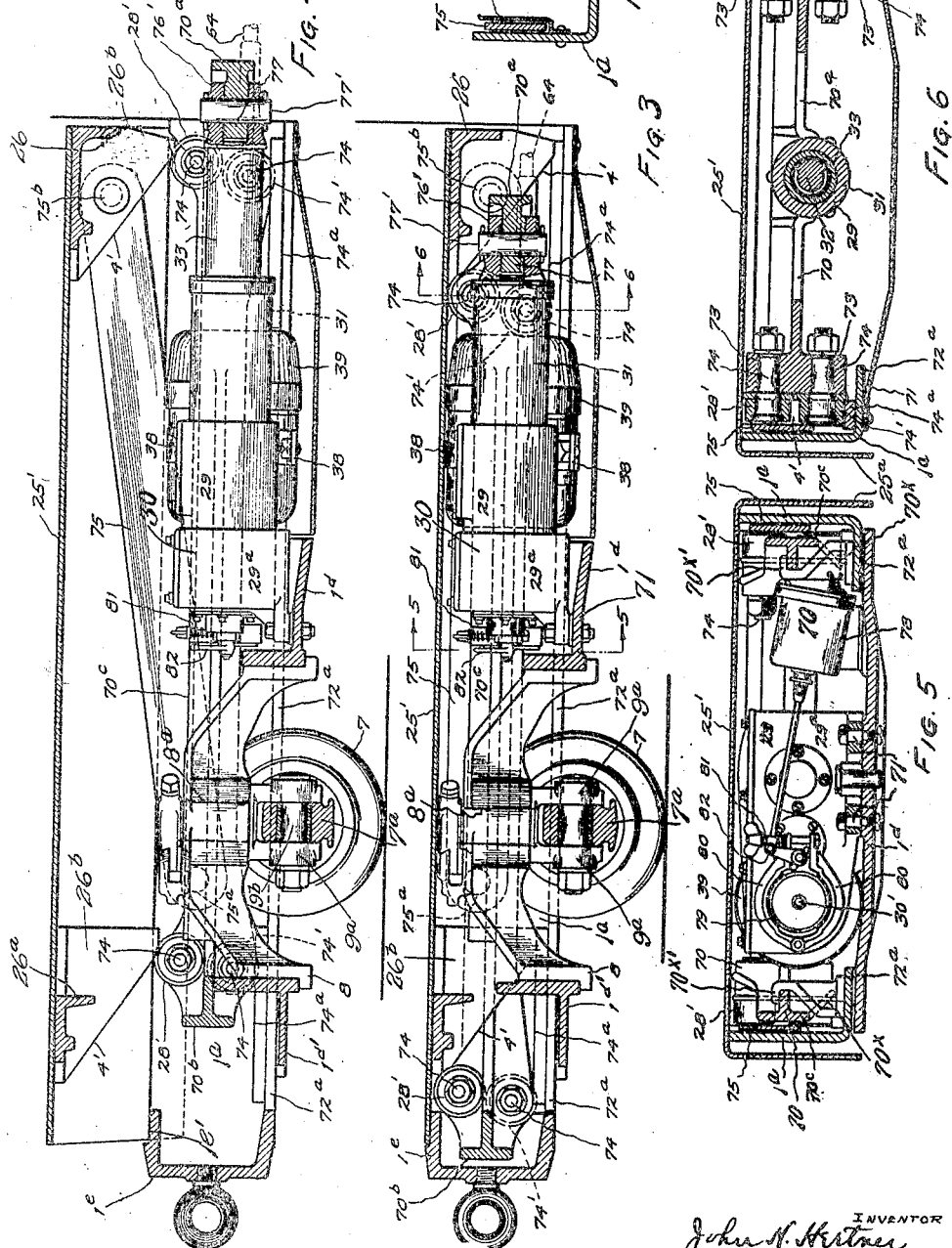

Patented Feb. 17, 1925.

1,527,136

UNITED STATES PATENT OFFICE.

JOHN H. HERTNER, OF CLEVELAND, OHIO, ASSIGNOR TO THE BAKER R & L COMPANY, OF CLEVELAND, OHIO, A CORPORATION OF OHIO.

TRUCK.

Original application filed September 10, 1919, Serial No. 322,835. Divided and this application filed April 13, 1922. Serial No. 552,360.

*To all whom it may concern:*

Be it known that JOHN H. HERTNER, a citizen of the United States, residing at Cleveland, in the county of Cuyahoga and State of Ohio, has invented certain new and useful Improvements in and Relating to Trucks, of which the following is a specification.

This invention relates to a truck, particularly a truck of the elevating platform type, adapted to load and transport or move articles, commodities, materials or containers therefor from place to place in a rapid manner and to unload the same, if desired.

This application is a division of my application for truck, filed September 10, 1919, Serial No. 322,835, Patent No. 1,505,889, Aug. 19, 1924.

One object of the invention is to mount the platform elevating mechanism and operating motor therefor upon the load bearing portion of the truck frame, whereby the weight of this mechanism and motor may be utilized to steady the frame and overcome any tendency of its load carrying end to rise due to the rapid handling and reversal of movement of the truck.

Another object of the invention is to so position the platform elevating mechanism and operating motor therefor that the same may be readily accessible for assembly, disassembly, inspection, adjustment, lubrication and repairs.

Another object of the invention is to mount the platform operating motor upon the main frame of the truck, this arrangement permitting the traction motor to be positioned horizontally, if desired, and freely accessible and the batteries to be positioned in a relatively low, horizontal plane, whereby the center of gravity of the vehicle is lowered and the operator's view of the load carrying end of the truck is at all times unobstructed.

Another object of the invention is to provide an improved mechanism for raising and lowering the platform, whereby relatively heavy loads may be raised and lowered in an easy manner.

Another object of the invention is to provide an improved platform raising and lowering mechanism of relatively simple construction capable of economical manufacture and ready assembly.

Another object of the invention is to provide an improved elevating platform truck capable of operating to load, transport and unload materials or articles in a rapid manner.

A further object of the invention is to provide an improved elevating platform truck in which the elevating mechanism and the motor therefor may be operated to raise and lower relatively heavy loads without undue strains upon the mechanism or motor in a ready and quick manner.

Other objects of the invention will be apparent to those skilled in the art to which my invention relates from the following description taken in connection with the accompanying drawings.

For the purpose of illustration, I have, in the accompanying drawings shown and herein described one form of apparatus embodying my invention.

In the drawings, Fig. 1 illustrates a side elevation of a motor truck, partly broken away, embodying my invention.

Fig. 2 is a fragmentary top plan view, parts thereof being broken away.

Fig. 3 is a longitudinal sectional view on the line 3—3 of Fig. 2.

Fig. 4 is a view corresponding to Fig. 2, but showing the platform elevated.

Fig. 5 is a transverse sectional view on the line 5—5 of Fig. 3.

Fig. 6 is a transverse section on the line 6—6 of Fig. 3.

Fig. 7 is a fragmentary sectional view on the line 7—7 of Fig. 2.

In the drawings, 1 indicates as an entirety the frame of the truck. The truck frame may comprise a pair of longitudinal, relatively low main or side members $1^a$, cross members $1^d$, $1^{d'}$, an end member $1^c$, a pair of inner, elevated horizontal sills (not shown), connected at their inner ends to the main or side members $1^a$ by brackets $1^f$, a pair of outer horizontal sills $1^{b'}$, cross bars and uprights $1^g$ (only one being shown). All of these members or elements may be secured together in any well known manner, for example by rivets, to form a rigid frame and the sills and cross members may be channel or angle shaped to insure strength and rigidity; whereas the longitudinal members 1ª are preferably formed from L bars so that their inturned walls 72ª may serve as supports for an intermediate frame 70 to be later described. The horizontal sills, cross bars and uprights 1ᴱ may constitute an auxiliary or elevated frame or section to support the necessary storage batteries 2 and a traction motor 3.

The cross bars preferably extend beyond the longitudinal side members 1ª to form an enlarged housing 5 which protects the traction wheels 6 (see Fig. 1) and encloses the motor 3 therefor and storage batteries 2. The traction wheels 6 are mounted on spindles which are connected to the adjacent axle (not shown) by suitable knuckles whereby they may be used for steering purposes. The knuckles and axle are preferably constructed to receive and support driven axle sections, which are connected by universal joints with the wheel spindles to drive the latter.

7 indicates a pair of relatively small supporting wheels mounted below the main or relatively low portion of the truck frame 1. The wheels 7 may be of any desired form of construction. 7ª indicates the axle for the wheels 7.

8 indicates a truss member arranged midway between and parallel to the frame members 1ª. The front and rear ends of the truss member 8 are connected in any well known manner to and supported by the cross members 1ᵈ and 1ᵈ'. 8ª indicates an opening formed in the truss member 8 to receive and support a king bolt 9 connected at its lower free end to the axle 7ª. The lower free end of the king bolt 9 is preferably bifurcated as shown at 9ª, and straddles the axle 7ª. 9ᵈ indicates a pin or bolt which extends through openings formed in the bifurcations 9ª and axle 7ª and pivotally connects the king bolt 9 and axle 7ª together, this form of construction permitting the wheels 7 to rock about the lower end of the king bolt 9 and accommodate themselves to the unevenness of the floor at all times.

10 indicates a platform on which the operative stands. The platform may be pivoted to a bracket 10ª supported by depending plates 10ᵇ on the uprights 1ᴱ, whereby it may be raised and thrown back against the truck when the latter is not in use. 11 indicates a brake pedal so arranged on or relative to the platform that the operative can readily operate it with his foot while standing thereon. The pedal 11 is preferably pivoted on the same rod or shaft as the platform 10 so that both may be thrown into an inoperative position together. The pedal 11 is connected to and operates the brake (not shown) which acts upon the traction motor 3 or an element driven thereby. The brake is spring operated and the connections are so arranged that downward pressure on the pedal 11 will release the brake, which condition will continue until the pressure on the pedal is released.

12 indicates a controller through which the electric circuit from the batteries 2 is completed to operate the motor 3 in either direction. 13 is a suitable handle having a trigger mechanism 13ª, for operating the controller 12.

The traction and supporting wheels 6 and 7 are preferably connected together whereby they may be steered simultaneously to facilitate operation and handling of the truck from place to place and into and out of loading and unloading position. The steering mechanism is operated by a handle 14ª, pivoted to a post 14 which is mounted in suitable bearings carried by the adjacent upright 1ᴱ. The lower end of the post 14 carries an arm 14ᵇ pivotally connected to a rod 15 which in turn is connected to one of the wheels 6; whereas the king bolt 9 has secured to it a lever 23, pivotally connected to a rod 23ª, by means of which both pairs of wheels 6, 7, are connected for simultaneous steering operation. As the steering mechanism may be of any desired construction and is fully described in my aforesaid application, further description thereof will not be necessary.

25 indicates as an entirety the raising and lowering platform for the truck. It is preferably formed of sheet metal shaped to form a top 25' having depending side walls 25ª. The frame end member 1ᵉ is preferably cut away at 1ᵉ' to permit the platform, when lowered, to lie flat with its upper surface. 26, 26ª, indicate a pair of channel bars arranged near the opposite ends of the platform 25 and extending transversely thereof. At its opposite ends each bar 26, 26ª, is provided with depending arms 26ᵇ, which at their lower ends are shaped to form inclines 4', all disposed correspondingly at the same angle to the horizontal, and arranged to be engaged by a set of rollers 28' carried by a frame 70 to raise and lower the platform 25.

The frame 70 may comprise a casting having end members 70ª, 70ᵇ, and side members 70ᶜ. At its opposite ends the walls of the frame 70 are thickened (see Fig. 6) and formed with openings 73 in which are mounted stub shafts 74. The upper shafts 74 carry the rollers 28' already referred to; while the lower shafts carry rollers 74' which engage suitable guides 74ª on the inturned ends 72ª of the frame members 72 and permit the frame 70 to move endwise horizontally in opposite directions to effect the raising and lowering of the platform 25. The lowermost or normal position of the platform 25 is shown in Figs. 1 and 3. When the platform 25 is in this position, the intermediate frame 70 is arranged adjacent to that end of the frame remote from the batteries (see Fig. 3) and when moved forward, it operates through the engagement of the rollers 28' with the inclines 4' to elevate the platform 25 to the position shown in Fig. 4. The platform 25 is held against longitudinal movement by a pair of links 75 preferably pivoted at their opposite ends in any well known manner to the frame members 1ᵃ and platform 25, as shown at 75ᵃ, 75ᵇ. 76 indicates a guide plate fixed to each frame member 1ᵃ and serving to guide the adjacent link 75 as it moves up and down. As will be understood, the links 75 permit the platform 25 to rise substantially vertical, but hold it against longitudinal movement in order that the rollers 28' may co-act with the inclines 4' to elevate the platform.

70' indicates means for maintaining the frame 70 in sliding engagement with its guides 74ᵃ, thereby preventing tilting of the frame 70 or movement of its inner end upwardly due to the positioning of a load at or adjacent its outer end. The means 70' are secured to the frame 1, being preferably carried by the relatively low frame section 1ˣ. In the illustrated form of construction, the means 70' comprise one or more upstanding devices 70ˣ, or pairs of such devices, preferably secured to the inturned flanges of the side members 1ᵃ and each provided with a laterally extending flange or lip 70ˣ', which engages the upper surface of the frame 70 or the projecting rib thereof (see Fig. 5).

29 indicates the power mechanism for moving the frame 70 forwardly and rearwardly on the guides 74ᵃ to effect the raising and lowering of the platform 25. Of this mechanism, 29ᵃ indicates a hollow casing forming a chamber 30 for suitable speed reducing gears and a chamber 31 for a screw or worm 32 and a nut 33.

38 indicates a cradle or other suitable device for connecting an electric motor 39 to the casing 29ᵃ, preferably that portion thereof forming the chamber 31. The motor 39 is supported so that is may be readily connected to a shaft 30' (see Figs. 2 and 5) of the gearing within the casing 29ᵃ. The motor 39 is arranged to be driven in opposite directions to rotate the screw or worm 32 in either direction to raise or lower the platform 25. The motor 39 and casings 29ᵃ are rigidly connected to the frame members 1ᵃ and cross members 1ᵈ'; certain of which connections are indicated at 71. The motor 39, speed reducing gears and other elements, forming part of the power mechanism are preferably constructed in the manner set forth in my aforesaid application and therefore further description will not be necessary herein.

The nut 33 preferably comprises a hollow thrust member, which slidably fits at its inner end into an opening, leading into the chamber 31. The outer end of the nut 33 is bifurcated at 76' to receive between them the web portion 77 or a lug carried by the intermediate frame 70. The bifurcations 76' and web portion 77 are formed with openings, adapted to register with each other to receive a pin 77', whereby the nut and frame 70 are connected together.

When the motor 39 is mounted as just set forth, I prefer to provide an electric brake, the solenoid 78 for which is preferably mounted in any desired manner on the cross member 1ᵈ' (see Figs. 2 and 5).

79 indicates a brake wheel fixed to the shaft 30' and arranged to be engaged by braking elements 80. The braking elements may be of any desired construction. They are preferably controlled by a spring 81, which tends to maintain them in engagement with the brake wheel at all times, and a rocker 82, which is connected to and operated by the core of the solenoid 78. The electric connections for the solenoid are such that when the motor 39 is stopped all current is cut out of the solenoid; but when the motor is started current will flow to and through the solenoid winding and energize it and hence cause the brake to be released.

The motor 39 may be controlled by a suitable controller (not shown) which is arranged to be actuated by a handle 56, mounted on the truck frame as shown in Fig. 1; and such controller may be operated automatically to neutral position by the mechanism shown in my aforesaid application, the connection thereof with the frame 70 being shown at 64 (Fig. 2).

In my construction of motor truck I secure many important advantages, namely, among others, compactness, simplicity and cheapness of construction. Furthermore, I am enabled to properly distribute the weight of the vehicle upon all its wheels, this arrangement also being advantageous in that it tends to permit easier steering. By mounting the elevating motor 39 and the driving connections between it and the elevating platform below the latter preferably at a point adjacent to the supporting wheels 7, I am enabled to utilize their weight and the weight of other elements associated with the motor to maintain the wheels 7 in engagement with the floor at all times and completely overcome the tendencies in apparatus of the character, to tilt upwardly when in operation due to starting and stopping of the apparatus. This arrangement also permits the housing and frame-work over the traction wheels 6 to be made lower so that the operator standing on the platform has an unobstructed view at all times. Notwithstanding the fact that the elevating motor is arranged below the rising and falling platform, I am enabled to provide a relatively low vehicle frame on which the platform rests when in its lowermost position and to insure ample movement upwardly and downwardly for the platform to meet the usual conditions for which this type of vehicle is intended.

To those skilled in the art to which this invention relates many alterations in construction and widely differing embodiments and applications of my invention will suggest themselves without departing from the spirit and scope thereof. My disclosures and the description herein are purely illustrative and are not intended to be in any sense limiting.

What I claim is:

1. In apparatus of the class described, the combination of a frame having an elevated section and a relatively low section, supporting wheels for said frame, a platform movably supported on said relatively low frame section and adapted to be moved upwardly relative thereto, a motor supported by said relatively low frame section underneath said platform, an intermediate frame slidably mounted on said relatively low frame section and arranged to move said platform vertically when moved in one direction, and connections between said motor and said intermediate frame for moving the latter.

2. In apparatus of the class described, the combination of a frame having an elevated section and a relatively low section, supporting wheels for said frame, a platform movably supported on said relatively low frame section and adapted to be moved upwardly relative thereto, a motor supported by said relatively low frame section underneath said platform, an intermediate frame slidably mounted on said relatively low frame section, co-acting elements between said platform and said intermediate frame arranged to move the platform upwardly when said intermediate frame is moved in one direction, and connections between said motor and said intermediate frame for moving it in one direction.

3. In apparatus of the class described, the combination of a frame having a relatively low section comprising a pair of longitudinal side members, a platform normally resting on said members, an intermediate frame movably mounted on said longitudinal side members and adapted to raise and lower said platform, a motor supported between said side members underneath said platform, and connections between said motor and intermediate frame for moving the latter.

4. In apparatus of the class described, the combination of a frame having a relatively low section, a platform arranged to engage said relatively low section when in its lowered position, an intermediate frame slidably mounted on said relatively low frame section, inclines and rollers carried by said platform and intermediate frame and arranged to co-act to move said platform relative to said low frame section when said intermediate frame is moved in one direction, and means including a motor arranged underneath said platform and supported by said relatively low frame section for moving said intermediate frame and through it move said platform.

5. In apparatus of the class described, the combination of a frame having a relatively low section, supporting wheels for said frame, a platform on and movable upwardly and downwardly relative to said low frame section, and mechanism arranged underneath said platform and carried by said low frame section for operating said platform, said mechanism including a frame mounted to reciprocate on said low frame section, a motor for operating said reciprocatable frame, and connections between said reciprocatable frame and platform.

6. In a truck construction, the combination of a pair of frame members, supporting wheels therefor, a platform mounted to move upwardly and downwardly relative to said frame members, an intermediate frame arranged underneath said platform and slidably mounted on said frame members and operatively connected to said platform to move it, a casing element and a thrust element, one of said elements being connected to said intermediate frame and the other of said elements being connected to said frame members, a motor supported between said frame members below said platform, and driving connections within said casing element and between said motor and said thrust element for moving the latter.

7. In apparatus of the class described, the combination of a frame having a pair of relatively low, longitudinally extending side members, supporting wheels for said frame, a platform mounted to move upwardly and downwardly relative to said members, an intermediate frame slidably supported on said side members to move endwise between them and said platform, devices interposed between said intermediate frame and said platform for raising the latter when the intermediate frame is moved in one direction, means, including a motor, between said side members and below said platform for operating said intermediate frame, and means connected to one of said side members and said platform and arranged to prevent endwise movement of the latter while being moved.

8. In apparatus of the class described, the combination of a frame, supporting wheels therefor, a platform mounted on the frame and connected thereto by a device which permits its movement vertically, a motor, an intermediate frame slidably mounted on said first mentioned frame between it and said platform, power mechanism between said motor and intermediate frame, said mechanism including a screw and a nut the axes of which are disposed substantially in the plane of movement of said intermediate frame, and devices between said intermediate frame and said platform for raising the latter when said intermediate frame is moved in one direction.

9. In apparatus of the class described, the combination of a frame having an elevated portion and a low lying portion carrying a platform adapted to be projected into lifting relationship to a load to engage the same, supporting wheels for said frame, means for driving certain of said wheels, and means disposed on said low lying portion of the frame and below said platform for raising and lowering the latter, said means comprising an intermediate frame slidably engaging said low lying portion, a motor mounted on said low lying portion and devices between said motor and said intermediate frame for sliding it and between said intermediate frame and said platform for vertically moving the latter.

10. In apparatus of the class described, the combination of a frame having an elevated portion and a low lying portion carrying a platform adapted to be projected below loads to engage the same, supporting wheels for said frame, means for driving certain of said wheels, and means disposed on said low lying portion of the frame and below said platform for raising and lowering the latter, said means comprising an intermediate frame slidably engaging said low lying portion, a motor mounted on said low lying portion, a mechanism, including a screw and a nut, between said motor and said intermediate frame for sliding it and devices between said intermediate frame and platform for moving the latter vertically.

11. In apparatus of the class described, the combination of a frame having an elevated portion and a low lying portion carrying a platform adapted to be projected into lifting relationship to a load to engage the same, supporting wheels for said frame, means for driving certain of said wheels, means disposed on said low lying portion of the frame and below said platform for raising and lowering the latter, said means comprising an intermediate frame slidably engaging said low lying portion, a motor mounted on said low lying portion and devices between said motor and said intermediate frame for sliding it and between said intermediate frame and platform for vertically moving the latter, and connections between said frame and said platform co-acting to prevent endwise movement of the latter when acted upon by said intermediate frame.

12. In an elevating platform truck, the combination of a frame comprising a relatively low frame section and an elevated section, traction wheels for said elevated section, means supported by said elevated section for driving said traction wheels, supporting wheels for said low frame section, a platform carried by the latter section and bodily movable relative thereto, a motor stationarily carried by said low frame section between the sides thereof and below the plane of its upper surface, and connections between said motor and said platform for raising and lowering the latter.

13. In apparatus of the class described, the combination of a frame having a pair of relatively low horizontal, longitudinally extending members at one end of the frame, supporting wheels for said frame, two of said wheels being relatively small in diameter and arranged near the outer end of said horizontal members, a platform movably mounted on said horizontal members, whereby it may be raised and lowered, and mechanism, including a motor, stationarily mounted between said horizontal members and a slide mounted on said horizontal members and operatively connected to said platform for raising and lowering it.

14. In a truck construction, the combination of a frame having a pair of relatively low horizontal longitudinally extending members, a pair of transverse members between said horizontal members, a longitudinal support connected to said transverse members and arranged centrally of said longitudinally extending members, a pair of wheels mounted to swing relative to said support, a platform movably mounted on said longitudinally extending members, whereby it may be raised and lowered, and operating mechanism for raising and lowering said platform, said mechanism including a motor stationarily supported between said longitudinally extending members and a slide mounted thereon and operatively connected to said platform for operating it, said transverse members, support, wheels and operating mechanism being disposed below the plane of the upper surfaces of said longitudinally extending members.

15. In apparatus of the class described, the combination of a frame having a pair of relatively low horizontal members, supporting wheels for said frame, power means for driving certain of said wheels, a platform mounted on said horizontal members, a slide movably mounted on said horizontal members, sets of co-acting devices between said slide and said platform, one set comprising a plurality of inclines and the other set comprising a plurality of rollers engaging the said inclines, a motor mounted between said horizontal members below the upper surfaces thereof, and an element operated by said motor in a direction parallel to the vertical planes in which said rollers move to engage said inclines and having operative connection with said slide to move it, whereby the said sets of devices co-act to raise and lower said platform relative to said members.

16. In a truck construction, the combination of a frame having a relatively low section comprising a pair of longitudinally extending side members, traction and supporting wheels for said frame, a platform arranged to be supported by said side members when in its lowered position and bodily movably upwardly relatively thereto, a slide mounted to move on said side members and operatively connected to said platform to operate it, a motor supported between said side members, a thrust member operatively connected to said slide, and screw and nut elements, one said element being operatively connected to said motor and the other said element being connected to said thrust member for operating said thrust member.

17. In apparatus of the class described, the combination of a frame having a pair of relatively low side members provided with inturned flanges, traction and supporting wheels for said frame, a platform bodily movable vertically relative to said side members, a slide movably engaging said inturned flanges and operatively connected to said platform, a thrust member connected to said slide to operate it, a motor supported between said side members, and driving connections between said motor and thrust member.

18. An apparatus as claimed in claim 6 in which the driving connections include a reduction gearing.

19. An apparatus as claimed in claim 9 in which is provided a connection between said frame and said platform.

20. In apparatus of the class described, the combination of a frame having a pair of relatively low side members provided with inturned flanges, traction and supporting wheels for said frame, a platform bodily movable vertically relative to said side members, a slide movably engaging said inturned flanges and operatively connected to said platform, a thrust member connected to said slide to operate it, a motor supported between said side members, driving connections between said motor and thrust member, and means between said side members and said platform for preventing endwise movement thereof while moving vertically.

21. In apparatus of the class described, the combination of a frame having a pair of relatively low side members provided with inturned flanges, traction and supporting wheels for said frame, a platform bodily movable vertically relative to said side members, a slide movably engaging said inturned flanges and operatively connected to said platform, a thrust member connected to said slide to operate it, a motor supported between said side members, driving connections between said motor and thrust member, and a pair of links each pivotally connected at one end to one side of said platform and at its opposite end to the adjacent side member.

22. In a truck construction, the combination of a frame having a pair of longitudinally extending, relatively low side members, traction and supporting wheels for said frame, a platform bodily movable upwardly and downwardly relative to said side members, a slide movably mounted on said side members and operatively connected to said platform to operate it, a thrust member disposed longitudinally of and between said side members and connected with said slide to move it, a motor supported between said side members and arranged between said thrust member and one of said side members with its shaft extending parallel to said thrust member, and driving connections between said motor and said thrust member for operating the latter.

23. In apparatus of the class described, the combination of a frame having an elevated section and a relatively low section, supporting wheels for said frame, a platform adapted to be moved upwardly and downwardly relative to said relatively low frame section, a motor supported by said relatively low frame section in a plane below said platform, an intermediate member slidably mounted on said relatively low frame section, means between said platform and said intermediate member arranged to move said platform when said intermediate member is moved in one direction, connections between said motor and said intermediate member for moving the latter, and means carried by said frame and engaging said intermediate member to maintain it in sliding engagement with said relatively low frame section.

In testimony whereof, I have hereunto affixed by signature.

JOHN H. HERTNER,